Jan. 30, 1962 M. L. DE POY II, ET AL 3,019,431
PULSE RADAR SYSTEM WITH MICROWAVE SWITCH
Filed Oct. 6, 1958 3 Sheets-Sheet 1

INVENTORS.
MARTIN L. DEPOY II,
ROBERT F. LUCY and
BRUNO A. PATTAN
BY Spencer E. Olson
ATTORNEY.

Jan. 30, 1962 M. L. DE POY II, ET AL 3,019,431
PULSE RADAR SYSTEM WITH MICROWAVE SWITCH
Filed Oct. 6, 1958
3 Sheets-Sheet 2
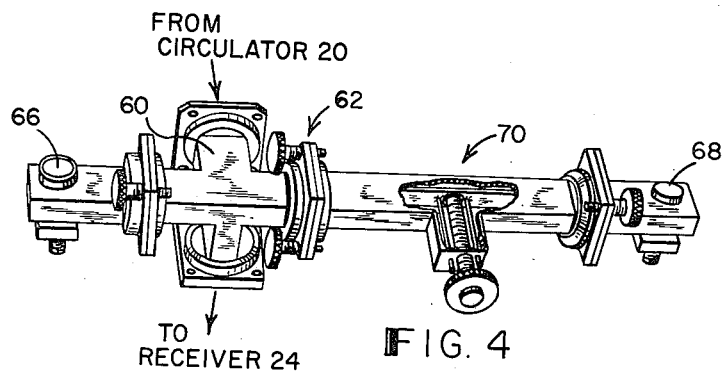
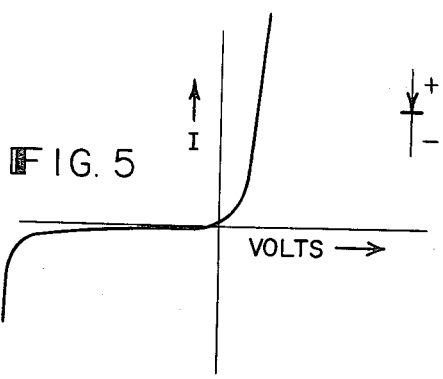
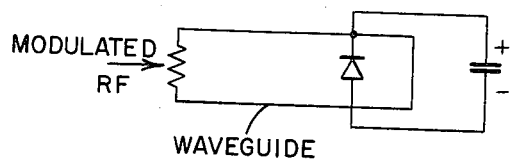
INVENTORS:
MARTIN L. DEPOY II,
ROBERT F. LUCY and
BRUNO A. PATTAN
BY
ATTORNEY.

INVENTORS.
MARTIN L. DEPOY II,
ROBERT F. LUCY and
BRUNO A. PATTAN
BY Spencer E. Olson
ATTORNEY.

United States Patent Office 3,019,431
Patented Jan. 30, 1962

3,019,431
PULSE RADAR SYSTEM WITH MICROWAVE SWITCH
Martin L. De Poy II, Westboro, Bruno A. Pattan, Roslindale, and Robert F. Lucy, Stoneham, Mass., assignors, by mesne assignments, to Sylvania Electric Products Inc., Wilmington, Del., a corporation of Delaware
Filed Oct. 6, 1958, Ser. No. 765,599
2 Claims. (Cl. 343—17.1)

This invention relates to switches for microwave power, and more particularly to a high speed switch utilizing semiconductor crystals.

Antireciprocal circulators employing ferrites or other materials are employed in microwave systems, such as radars, to provide duplexing; that is, isolating the receiver from the transmitter during periods of transmission, while permitting echo signals to pass to the receiver during the period between transmitted pulses. Often, however, available circulators fail to provide adequate isolation of the transmitter and receiver, and there is an undesirable leakage of transmitter power to the receiver. Therefore, in the use of such circulators there is a need for the insertion of a microwave switch between the circulator and the receiver which will provide high isolation under the condition of relatively high incident power (transmitter leakage not isolated by the circulator) and which has a low insertion loss during the receiving period. For this application, it is important that the switch have a fast rise and fall time as well as being capable of switching at high repetition rates. Moreover, since it has been found desirable to employ radar systems having high repetition rates in airborne equipment, it is important that the weight, power requirements, and size of this microwave switch be minimum.

At high repetition rates, gaseous discharge tubes, commonly known as T.R. tubes, and mechanical shutter devices, are unsatisfactory. Low noise traveling wave tubes can be made to satisfactorily perform the switching function, but presently available models require a bulky and heavy solenoid, and a large amount of solenoid power to accomplish switching, making this form of switch somewhat impractical and unfeasible for airborne applications. Ferrites, also, have been applied with some success in a microwave switch, but at high repetition rates and fast rise times, the power required for modulation of the magnetic field applied to the ferrite is prohibitively large. In a ferrite switch of which applicants are aware, for on-to-off switching ratios of 30 db at a 400 kilocycle repetition rate in X-band operation, modulation powers of 200–300 watts are required. It is obvious that this expenditure of power to effect a switching function is quite undesirable.

Accordingly, it is an object of this invention to provide an improved switch, simpler than those heretofore known, for microwave systems.

It is a further object of this invention to provide a microwave switch capable of operation at high repetition rates, and having fast rise and fall times.

A more specific object of the invention is to provide a microwave switch for radar systems employing antireciprocal circulators for insertion between the circulator and the receiver of the system to provide additional isolation of the receiver with a minimum expenditure of power to perform the switching function.

Still another object of the invention is to provide an improved microwave switch for a microwave system which affords high isolation to unwanted energy yet has a low insertion loss for energy to be passed by the switch.

A microwave switch, in accordance with the invention, employs a pair of semiconductor crystals arranged to absorb unwanted signals and to reflect the wanted signals in such a manner as to be transmitted through the switch. One arrangement of the switch may employ a short slot hybrid balanced mixer having input and output terminals with the crystals mounted as they are in the conventional mixer and biased to match the impedance of the waveguide during the periods when the transmitter is on. Under these conditions, transmitter leakage power from the circulator applied to one input terminal of the balanced mixer is absorbed by the crystals and an insignificant amount of power is transmitted from the other arm. During the periods between transmitted pulses, when echo signals are expected, the crystals are biased to mismatch and therefore reflect the signal power incident thereon, and by virtue of the action of the hybrid is transmitted out the other arm of the mixer to the receiver.

In another form of the switching arrangement, a magic-T is used, the crystals being located at either side of the junction in the coplanar arms of the magic-T. A phase shifter, adjusted to give 90° phase shift per pass, is inserted in one arm between the junction and the crystal, and the input from the circulator is to the series arm of the tee and the output to the receiver is the shunt arm. If no crystals were inserted in the coplanar arms, the signal would enter the series arm and split evenly between the two coplanar arms. The signal transmitted down the arm having the phase shifter would be reflected and arrive back at the shunt arm in phase with the signal from the other arm; the signals would then add and pass out the shunt arm. With crystals inserted in the coplanar arms, and biased to match the impedance of the waveguide during the transmitted pulse, the crystals absorb the power incident thereon and no signal is propagated from the shunt arm. However, by biasing the crystals to a severe mismatch during periods of reception, the signals are reflected much in the same way as if the crystals were absent and maximum transmission from the shunt arm occurs.

The novel features of this invention, as well as the invention itself, both as to its organization and method of operation, will best be understood from the following description, taken in conjunction with the accompanying drawing, in which:

FIG. 4 is an isometric view, partially cut away, of a switch employing a magic-T;

FIG. 5 is the voltage-current characteristic of a semiconductor crystal, and FIG. 6 is an equivalent circuit diagram of the crystal mounted in a waveguide, both being useful in explaining the operation of the switch;

Figure 1:
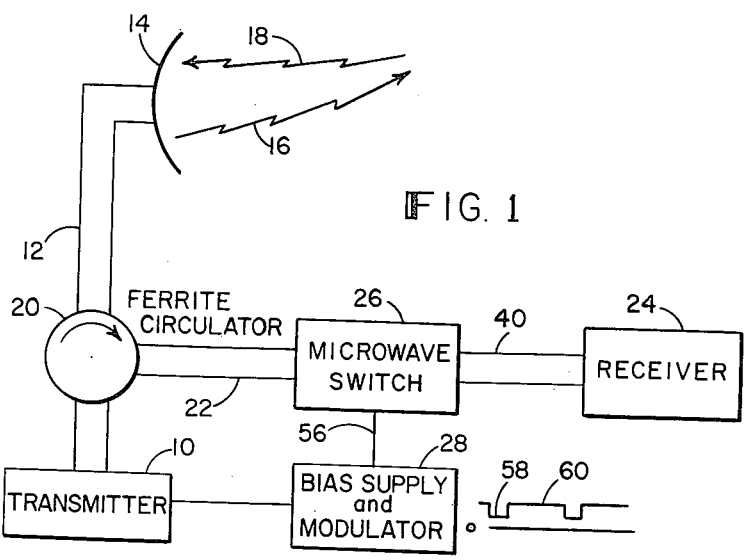
FIG. 1 is a schematic diagram of a radar system utilizing the principle of the invention.

In FIG. 1, a radar set incorporating the invention is shown in which a transmitter 10, which may be a magnetron or other source of radio frequency energy, is pulse modulated to propagate pulse modulated radio frequency energy up a transmission line 12 to an antenna 14 which propagates radio frequency energy outward, as indicated by the arrow 16, until it strikes a target and is reflected back to the antenna, as indicated by the arrow 18. This reflected signal proceeds from the antenna 14 down the transmission line 12 and, by virtue of the action of the ferrite circulator 20, is propagated out along the transmission line 22 toward a receiver 24. As is well known, the ferrite circulator 20 is operative to pass the pulses from the transmitter 10 to the antenna while isolating the receiver 24 from the transmitted pulse, and allows the received signal to pass into transmission line 22. Circulators of this type are very essential in radar systems where high repetition rate duplexing is required, and while they do provide a high degree of isolation, objectionable amounts of transmitter power may leak into the receiver 24. Such leakage power may damage the sensitive detector of the receiver, usually a crystal, or overload the receiver and produce signals which can be confused with the echo signals.

In accordance with this invention, additional isolation is provided between the transmitter and the receiver by the insertion of a microwave switch 26 in transmission line 22 between the circulator 20 and the receiver 24. It is apparent that switch 26 must be capable of operation at the repetition frequency of the transmitter 10, must be capable of absorbing leakage transmitter power at significant levels, and must have a low insertion loss for received signals. In addition, the switch must have fast rise and fall times so as to be open to received signals for essentially the entire period between transmitter pulses. Opening and closing of microwave switch 26 in synchronism with the transmitted pulses is accomplished by a circuit 28 designated "Biasing Supply and Modulator," the function and operation of which will be described in detail hereinafter.

Figure 2:
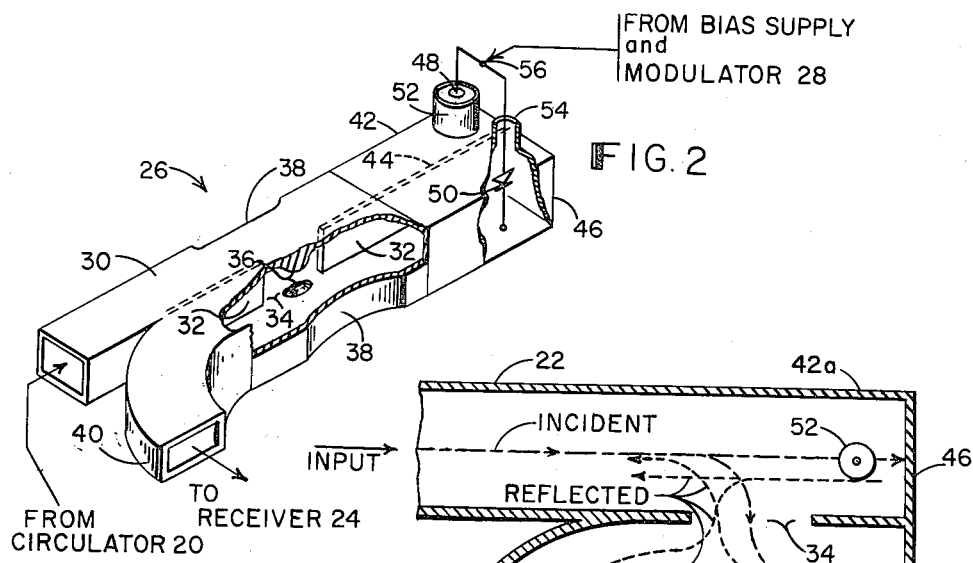
FIG. 2 is an isometric view, partially cut away, of a switch employing a short slot hybrid balanced mixer in the switching arrangement.
Figure 3:
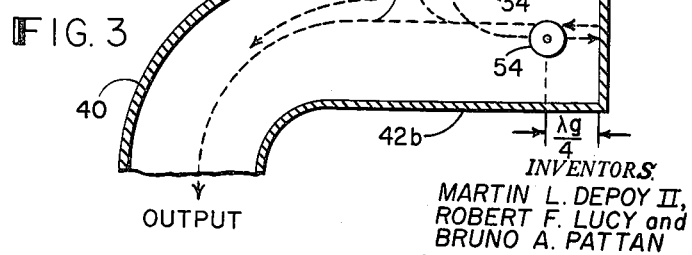
FIG. 3 is a sectional plan view, somewhat diagrammatic, of the structure of FIG. 2.

One form of the switch 26 is shown in FIGS. 2 and 3, and in terms of its physical construction corresponds to a commercially available short slot hybrid balanced mixer. Mixers of this type, shown generally in U.S. Pat. Nos. 2,790,073, and 2,834,876 comprise a waveguide hybrid 30 which may be of the form shown in Riblet Patent No. 2,739,287 and including two rectangular waveguides symmetrically joined along their common narrow walls 32. An aperture 34 is formed between the two waveguides by removing substantially all of the common wall for a distance of approximately one "free-space" wave length. The center of this aperture 34 is provided with "wave length-reducing" capacitive projections 36 which consist of flat rounded domes projecting into the central portions of the hybrid. The outside walls of the juxtaposed waveguides are provided with "wave length-increasing" inductive indentations 38 which parallel the aperture 34. Thus constructed, the coupler has broadband characteristics, an attribute of value in the present application. The signals from circulator 22, which include both transmitter leakage signals and echo signals, are coupled to one of the waveguides of the coupler through transmission line 22 and the output of the switch, namely, only the received echo signal, is transmitted to receiver 24 via transmission line 40. To the other terminals of the coupler are connected a short section of dual waveguide 42 having a common narrow wall 44, which may be an integral extension of the common wall 32 of the hybrid 30. These waveguides are both shorted at 46 and two non-linear impedances, such as microwave semiconductor crystal diodes 48 and 50 are respectively mounted in crystal holders 52 and 54 centrally of the two guides. The crystals are located equidistantly from the shorting end wall 46, preferably a quarter guide wave length at the center frequency of operation. Crystals 48 and 50 are preferably of the doubled ended variety, a type 1N263 having been found to have impedance characteristics satisfactory for the desired switching operation. The crystals are shown with their anodes connected to the broad walls of the waveguide and the cathodes connected to the bias supply and modulator 28, but it is to be understood that the polarity of the crystals may be reversed should it be desirable to reverse the polarity of the biasing signal or operate on one or the other side of the crystal current-voltage characteristic.

It will be helpful in the explanation of the operation of the switch of FIG. 2 to first consider the device with the crystals removed from their holders. Signal power applied to input arm 22 (which includes transmitter leakage power and signals) will divide in half at the aperture 34, with half being propagated into waveguide 42a and the other half into waveguide 42b if these two sections are well matched. The wave entering arm 42b differs in phase from the wave in arm 42a by 90°, both waves being reflected by the shorting termination 46. Both of the reflected waves again split in half at the aperture 34, the wave entering the output guide 40 from guide 42a being shifted in phase by 90°, and the wave entering guide 22 from 42b being also further shifted by 90°. A summation of the reflected wave amplitudes in guide 22 shows a cancellation of amplitudes, while the sum of the wave amplitudes at the output guide 40 is equal to the initial amplitude at the input 22. Thus, if perfect reflection occurs in both guides 42a and 42b, there is no loss and the output power at 40 is substantially equal to the input power at 22.

With the crystals inserted in their holders, isolation between input waveguide 22 and output waveguide 40 is afforded by biasing both crystals such that their impedance is substantially equal to the characteristic impedance of the waveguide structure. Since isolation is desired during the occurrence of the transmitted pulse, the crystals are biased to match the waveguide during the period of the transmitted pulse, a suitable biasing potential being applied to the crystals over conductor 56 from bias supply 28. With the crystals biased to match the waveguides, most of the power incident thereon, in this case, transmitter leakage power, is absorbed in the crystals, half of the input to waveguide 22 in each crystal, with the consequence that the output from waveguide 40 is substantially zero. With almost total absorption in the crystals, there is negligible reflection from the shorted end 46, whereby almost complete isolation is afforded for the receiver.

During the periods between transmitter pulses, when it is desired to transmit echo signals to the receiver, the crystals 48 and 50 are both biased to a different level where their impedance is grossly mismatched with respect to the characteristic impedance of the waveguide structure. Insofar as incident waves are concerned, the mismatched crystals appear as short circuits across the waveguide and the waves are reflected therefrom in the same manner as if the waves were permitted to propagate to the short 46. Since the crystals are located 90° from the short 46, a round trip path of 180°, the action of the hybrid coupler is as was described earlier, with cancellation occurring in input guide 22 and addition in output guide 40. There is some absorption in the crystals even when biased to mismatch, thus contributing to the insertion loss of the switch, but by optimum adjustment of the bias during the reception period to give maximum signal at output waveguide 40 and minimum insertion loss, it is possible to achieve insertion losses of less than 1 db.

From what has been said of the operation of the switch, it will be apparent that bias supply and modulator circuit 28 may take a variety of forms. For one polarity of the crystals, it is necessary that the potential applied to the crystals during the period of the transmitted pulse be at one level, designated at 58 in FIG. 1, and at another level 60 sufficient to cause mismatch during the period between transmitted pulses. The bias modulator circuit 28 is conveniently synchronized with the modulator which normally is present in the radar transmitter 10. By careful design of the bias supply and modulator circuit, the power required to supply modulation to the switch may be of the order of 25 milliwatts.

Using type 1N263 crystals at 48 and 50 an isolation of 30 db at an incident power level of 25 milliwatts has been obtained. At 150 milliwatts the isolation drops to 18 db, and at 500 milliwatts the isolation is about 8 db.

While the switch has been described as having a different bias potential applied to the crystals during the transmission and receiving periods of the radar system, under certain conditions of operation it may not be necessary to modulate the bias. For example, at high leakage power levels, the impedance of the crystals may change sufficiently due to absorption of incident power to make the switch self-operating without modulation of the bias. In this case, the crystals are biased to a point where they are mismatched during the period of reception, and incident power is relied upon to change the impedance of the crystals sufficiently during the period of transmission to match them to the waveguide and cause absorption of most of the incident power. Thus, in this case, the switch is self-operating, much like the conventional T.R. switch, except that the recovery time is much faster.

The principles of this invention may also be embodied in a magic-T waveguide structure, as shown in FIG. 4. The input signal from circulator 20 is applied to the series arm 60 of a magic-T 62 and the output is coupled from the series arm 64. A first semiconductor crystal, held by a suitable holder 66, is connected in one of the coplanar arms of the magic-T and a second crystal, supported in a suitable crystal holder 68, is inserted in the other coplanar arm. In order to get the proper phase relationships at the T junction, a phase shifter 70, adjusted to give 90° phase shift per pass is inserted in the coplanar arm between the junction and crystal 68. The phase shifter 70 may be of any of the many forms available to the art.

With the crystals removed from their holders, a signal entering the series arm 60 (which signal may comprise both leakage power and echo signals) divides equally into the two coplanar arms. The signal passing down the arm including the phase shifter 70 is reflected and arrives back at the shunt arm in phase with the signal from the other arm. These signals add at the junction and pass out through the shunt arm 64 to the receiver. As in the case of the hybrid switch, with the crystals inserted in their holders, and biased to mismatch, the action just described occurs. In other words, during periods of reception when it is desired that the echo signals pass to the receiver, the crystals are biased to severe mismatch. During the period of the transmitted pulse, however, when maximum isolation is required, the crystals are biased so as to match the impedance of the guide, a condition where the incident power is absorbed in the crystals, again one-half by each crystal, with little or no signal appearing at the shunt arm 64. The crystals may be biased and modulated in the same manner as was described in connection with FIG. 2, and what was said about self-operation of the hybrid coupler switch is equally valid for the magic-T arrangement. Isolations in excess of 30 db have also been obtained with the magic-T arrangement, with insertion losses less than 1 db.

It will be recognized that the isolation and insertion loss characteristics of both embodiments of the switch will be somewhat dependent on frequency. The short slot hybrid of the structure of FIG. 2 is a relatively broadband device, and consequently the bandwidth of the switch is commensurately broadbanded. The magic-T version is somewhat more sensitive to frequency than the short slot hybrid, primarily due to the requirement for phase shifter 70, but could be broadbanded with proper design. The magic-T itself, however, has a reasonable bandwidth, so by having an adjustable phase shifter, it is possible to achieve reasonable bandwidths with the magic-T version as well.

Figure 7:
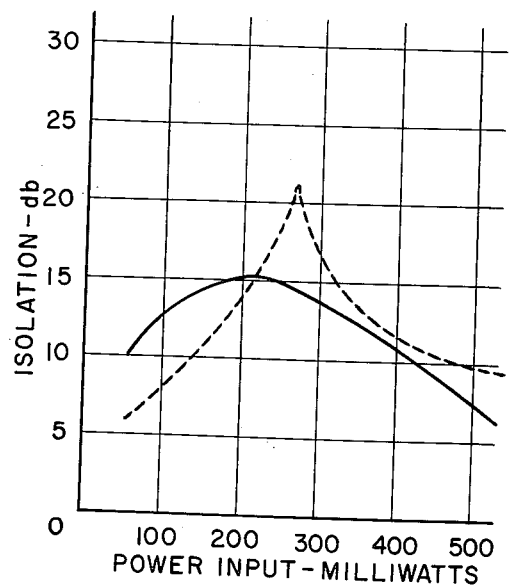
FIG. 7 is a curve showing the isolation of both embodiments of the switch as a function of power input.

FIG. 7 is a curve illustrating the isolation of both forms of the switch as a function of the power input with no bias whatever applied to the crystals. In this arrangement the crystals are open circuited, and exhibit a mismatched condition in the waveguides in the absence of signals, or in the presence of very weak low power signals. The incidence of power of greater than a few milliwatts on the crystals, and especially in the range between 100 and 500 milliwatts, alters their effective impedance so as to essentially match that of the waveguides and absorb the incident power, thereby to achieve the isolations shown in FIG. 7. Essentially the instantaneous power absorbed will depend upon the instantaneous impedance of the crystal waveguide structure. It will be noted that the magic-T embodiment affords a higher isolation than the short slot hybrid at one power level, but that the short slot hybrid affords a better average isolation over a range of input powers.

While the switch has been described as requiring biasing of the crystals to mismatch during the periods between transmitted pulses, it has been found that a microwave power levels greater than 10 milliwatts, the switching action takes place without modulation of the crystal bias. That is, a method of switching somewhat analgous to T-R tube operation has been observed; at low powers (receiver level) and with no bias, the switch transmits nearly all of the incident power; at high (transmitter leakage) levels of power, the transmission decreases as a greater amount of the signal is absorbed.

It is believed that the increase in absorption is explainable from the voltage-current characteristic of the 1N263 diode, a typical characteristic being shown in FIG. 5. For this type of diode, the inverse peak, where Zener or avalanche breakdown occur, is about one volt, while in the forward direction the maximum voltage that can be safely applied is a few volts. The current corresponding to one volt forward bias is about 50 milliamperes, while at two volts in the reverse direction the current is five milliamperes. The crystal may be considered as open circuited and shunted by the distributed capacity of the holder and crystal mount as shown in FIG. 6. For the 1N263 the distributed capacity is about eight micro-microfarads.

A low level radio frequency wave launched down the waveguide charges the capacity to the peak value of the wave in the direction of reverse bias on the crystal. This voltage remains fixed from cycle to cycle if the time constant of the circuit is long compared to the period of the R-F wave. At small reverse values of bias, the back resistance of the crystal is about 100K. The time constant of the combination works out to be $$RC = 8 \times 10^{-12} \times 10^5 = 8 \times 10^{-7}$$

while the period of the R-F is approximately $10^{-10}$ second at X-band frequencies. When the R-F is turned off, the charge on the capacity will discharge through the back resistance of the diode.

At power levels of about 0.5 milliwatt the responsivity of the crystal is one volt/milliwatt. Thus, 0.5 milliwatt will produce about a 0.5 volt signal. As the power is increased, the circuit capacity charges to a correspondingly higher voltage and biases the diode further in the back direction. At sufficiently high powers, several milliwatts for the 1N263, the signal voltage may swing from forward conduction to backward conduction (breakdown). Thus, the radio frequency wave in the forward direction will charge up the capacity in one direction. As the value of the voltage passes through the low conductance region nothing happens. Then, as the signal voltage exceeds the breakdown, current flows in the reverse direction, tending to discharge the capacity and charge it in the opposite direction. The energy discharged by the capacitor will be representative of the absorption of the crystal.

In the back direction (as with the forward direction), the limiting resistance is the spreading resistance of the germanium block. This is about 10 ohms at room temperature and decreases with temperature rise due to heat dissipation. Consequently, the time constant in the reverse direction could be as small as $8 \times 10^{-11}$ seconds or even smaller at elevated temperatures. This is the same order of magnitude as the period of the R-F wave, and thus considerable discharging can occur during the reverse swing of the signal.

At powers exceeding approximately 10 milliwatts, considerable absorption occurs. Powers up to 250 milliwatts peak-to-peak have been applied to a single crystal and increased absorption observed without encountering serious thermal problems. In the magic-T switch, isolations of 20 db have been reached at incident power levels of 250 milliwatts (125 milliwatts/crystal), and isolations obtained with the short-slot hybrid have been about 6 db lower at this same power level. Beyond 200-300 milliwatts the isolation has been found to decrease. The curves of FIG. 7 illustrate the isolation of both types of switch, operated without modulation, over a range of input powers.

Figure 8:
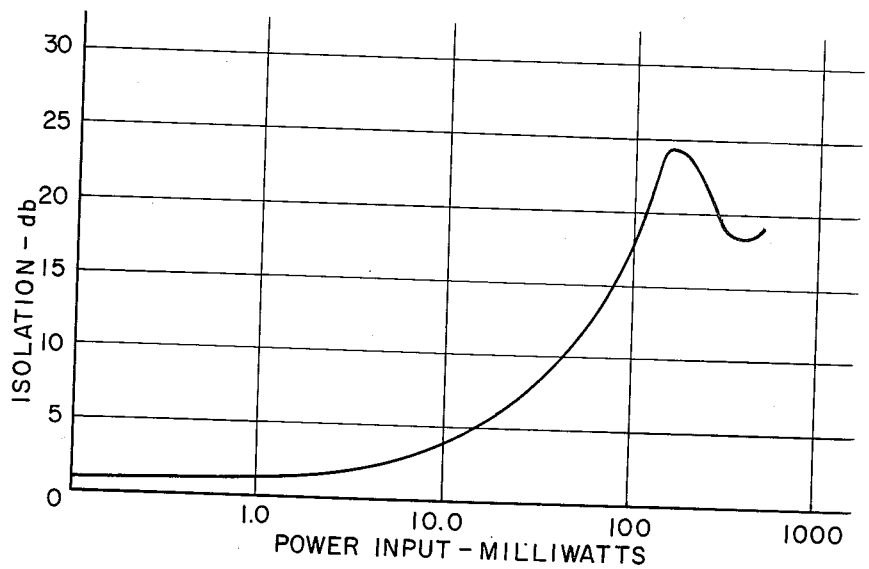
FIG. 8 is a curve showing the isolation characteristics of cascade-connected switches.

In order to obtain adequate isolation at still higher powers, that is, beyond about 300 milliwatts input, switches of the type described may be cascaded. FIG. 8 shows the isolation of two cascaded magic-T switches as a function of the input power for self-modulation, open-circuit operation. For low powers, the insertion loss is only about 1 db, while a peak of about 25 db isolation is reached at 150 milliwatts. At this level the second switch does not contribute to the isolation. However at 500 milliwatts the first switch provides only 10 db of isolation, as seen from FIG. 7, and thus there is sufficient power to self-modulate the second switch. The flattening of the curve at the higher power levels is the result of increasing self-modulation isolation in the second switch.

It appears that with proper design and operation of a cascaded pair of switches isolations of at least 30 db in the range of power inputs between 100 and 500 milliwatts is entirely possible. For example, the first switch may be operated open-circuited while the second switch is modulated as described earlier, which combination, based on data already obtained, can be expected to provide isolations of 40 db at 250 milliwatts, and 30 db at 500 milliwatts.

Although the invention has been described as used in a radar system, it can also be used in radio communications equipment and other applications where switching action of the type afforded by the switch is necessary. Likewise, the invention is not limited to the particular details of construction, as many equivalents will suggest themselves to those skilled in the art.

What is claimed is:

1. A radar system comprising, in combination, an antenna, a transmitter coupled to said antenna for generating a train of regularly spaced output pulses, a receiver, and means including a switch coupling said receiver to said antenna for transmitting to said receiver echo signals received by said antenna and rejecting leakage power signals from said transmitter between which said echo signals may occur, which leakage signals are of appreciably higher power level than said echo signals, said switch comprising a hybrid junction having first and second terminals coupled to said antenna and to said receiver, respectively, and third and fourth terminals, first and second equal length wave guide sections having a common narrow wall respectively connected to said third and fourth terminals, said wave guide sections being shorted at their remote ends, and first and second semiconductor crystal diodes having matched non-linear impedance characteristics and capable of absorbing microwave energy incident thereon in the range of power levels of said leakage power signals without damage positioned in said first and second wave guides, respectively, said diodes being further characterized in that the impedances thereof at energy levels of said echo signals are mismatched with the impedance of their respective wave guide sections to cause reflection of said echo signals incident thereon and coupling thereof to said receiver, and further, that the impedances thereof at energy levels of said leakage signals are matched to the impedance of their respective wave guide section to cause absorption of said leakage power signals.

2. A radar system comprising, in combination, an antenna, a transmitter coupled to said antenna for generating a train of regularly spaced output pulses, a receiver, means including a switch coupling said receiver to said antenna for transmitting to said receiver echo signals received by said antenna and rejecting leakage power signals from said transmitter between which said echo signals may occur, said switch comprising a hybrid junction having first and second terminals respectively connected to said antenna and to said receiver, and third and fourth terminals, first and second wave guide sections having a common narrow wall respectively connected to said third and fourth terminals and each shorted at its remote end, first and second semiconductor crystal diodes having matched non-linear impedance characteristics, and the capability of absorbing microwave energy incident thereon at the power levels of said leakage signals, respectively positioned in said first and second wave guide sections, and means coupled to said crystals for applying biasing voltages thereto during occurrence of said leakage power signals of a magnitude to match the impedance of said crystals with the impedance of said wave guide sections to cause absorption of said leakage signals and for applying biasing voltages thereto during the periods between said leakage power signals of a magnitude to cause a mismatch between the impedance of said crystals and the impedance of said wave guide sections to cause reflection of echo signals by said crystals and coupling thereof to said receiver.

References Cited in the file of this patent

UNITED STATES PATENTS 2,652,541    Cutler _____ Sept. 15, 1953